US012750439B2

(12) United States Patent
Dubois et al.

(10) Patent No.: US 12,750,439 B2
(45) Date of Patent: Sep. 29, 2026

(54) INITIATING VOICE COMMUNICATION BETWEEN TWO OR MORE COMMUNICATIONS DEVICES

(71) Applicants: Jakob Peter Dubois, Hovås (SE); Jean Gerhard Alexander Dubois, Hovås (SE)

(72) Inventors: Jakob Peter Dubois, Hovås (SE); Jean Gerhard Alexander Dubois, Hovås (SE)

(73) Assignees: Jakob Peter Dubois, Hovås (SE); Jean Gerhard Alexander Dubois, Hovås (SE)

( * ) Notice: Subject to any disclaimer, the term of this patent is extended or adjusted under 35 U.S.C. 154(b) by 307 days.

(21) Appl. No.: 18/411,768

(22) Filed: Jan. 12, 2024

(65) Prior Publication Data

US 2025/0233936 A1 Jul. 17, 2025

(51) Int. Cl.
*H04M 1/60* (2006.01)
*H04R 1/10* (2006.01)

(52) U.S. Cl.
CPC ........ *H04M 1/6066* (2013.01); *H04R 1/1041* (2013.01)

(58) Field of Classification Search
CPC ........................... H04M 1/6066; H04R 1/1041
See application file for complete search history.

(56) References Cited

U.S. PATENT DOCUMENTS 6,870,914 B1 * 3/2005 Bossemeyer ......... H04M 3/428 704/260
7,023,987 B1 * 4/2006 Prentice .............. H04M 1/2473 379/900
9,792,083 B2 * 10/2017 Coffman ................. G06F 3/165
10,820,087 B2 * 10/2020 Ha ........................... H04R 5/04
11,947,774 B1 * 4/2024 Alyafaie ............... G06F 3/0482
12,207,036 B2 * 1/2025 Goh ........................ H04W 4/80
2009/0061872 A1 * 3/2009 Hicks .................. H04L 65/1043 455/436
2010/0150383 A1 * 6/2010 Sampat .................... H04R 1/10 381/311
2013/0076491 A1 * 3/2013 Brandsma ......... H04W 52/0229 340/10.3
2014/0289157 A1 * 9/2014 Kenna, III .......... H04L 63/0428 705/344

(Continued)

*Primary Examiner* — Dominic E Rego
(74) *Attorney, Agent, or Firm* — Flaster Greenberg PC

(57) ABSTRACT

A method, a non-transitory computer readable medium, and a system for managing a request to transmit and play an audio stream relating to real time voice communication are disclosed. A request is received from a first communications device to transmit and play an audio stream relating to real time voice communication to a second communications device. It is determined whether the second communications device is available for receiving and playing the audio stream relating to real time voice communication, wherein the second communications device is determined to be available on condition that the second communications device is set to route the audio stream relating to real time voice communication to at least one earphone that is wirelessly connected to the second communications device. On condition that the second communications device is determined to be, playing the audio stream relating to real time voice communication in the at least one earphone.

11 Claims, 8 Drawing Sheets

(56) References Cited

U.S. PATENT DOCUMENTS

| | | | | |
|---|---|---|---|---|
| 2015/0195650 | A1* | 7/2015 | Vogt | H04R 27/00<br>381/77 |
| 2016/0036956 | A1* | 2/2016 | Debates | H04M 1/72406<br>455/419 |
| 2018/0189044 | A1* | 7/2018 | Das | H04W 4/50 |
| 2020/0278826 | A1* | 9/2020 | Patil | H04L 65/762 |
| 2022/0174118 | A1* | 6/2022 | Schulert | H04L 67/142 |
| 2022/0353616 | A1* | 11/2022 | Lee | H04W 4/80 |
| 2022/0369034 | A1* | 11/2022 | Kumar | H04R 5/04 |
| 2023/0020019 | A1* | 1/2023 | Bhowmik | H04R 25/554 |
| 2023/0325145 | A1* | 10/2023 | Ni | G06F 3/165<br>700/94 |
| 2024/0388757 | A1* | 11/2024 | Wang | H04N 21/4122 |
| 2025/0080911 | A1* | 3/2025 | Delikaris Manias | H04S 7/303 |

* cited by examiner

INITIATING VOICE COMMUNICATION BETWEEN TWO OR MORE COMMUNICATIONS DEVICES

TECHNICAL FIELD

The present invention relates to initiation of voice communication between two or more communications devices, and in particular to managing a request to transmit and play an audio stream relating to real time voice communication between two or more communications devices.

BACKGROUND

Some features of setting up a call from a user of a first phone to a user of a second phone have been essentially the same since the introduction of a public telecommunication system. For example, this has typically included forwarding a request from the first phone to the second phone which results in an alert, such as an audio, visual, and/or haptic alert, in the second phone indicating that the user of the first phone is trying to initiate a call with the user of the second phone. The user of the second phone may then select to accept the request by providing an input to the second phone and after this the call is initiated. With the development of the devices used for communication, new ways of accepting a call have been introduced such as pressing a button on a touch screen of the second phone, pressing a touch control on earphones connected to the second phone, using a voice command etc. Furthermore, provision of additional information has been enabled such as caller id in order provide the user of the second phone with further basis for determining whether or not to accept the request. However, with new ways of using communications devices, new principles in relation to initiating voice communication are desirable.

SUMMARY OF THE INVENTION

An object of the present invention is to provide a new principle for initiating voice communication between two or more communications devices.

According to a first aspect, a method for managing a request to transmit and play an audio stream relating to real time voice communication between a first communications device and a second communications device is provided. The method comprises receiving the request to transmit and play an audio stream relating to real time voice communication from the first communications device to the second communications device. The method further comprises determining whether the second communications device is available for receiving and playing the audio stream relating to real time voice communication, wherein the second communications device is determined to be available on condition that the second communications device is set to route the audio stream relating to real time voice communication to at least one earphone wirelessly connected to the second communications device. On condition that the second communications device is determined to be available, the audio stream relating to real time voice communication is played in the at least one earphone.

Unless otherwise specified, e.g. by indication of being muted, empty or the like, by 'audio stream' herein is meant an audio stream that when received and played will produce audible sound.

The audio stream may for example be transmitted via a server or peer-to-peer.

The received audio stream relating to real time voice communication may then be routed to and played in the at least one earphone wirelessly connected to the second communications device.

The method may further comprise determining that the second communications device is set to route the audio stream relating to real time voice communication to the at least one earphone by determining that the at least one earphone is arranged in an ear of a user of the second communications device. The method may then further comprise receiving a notification in the second communications device indicating that the at least one earphone is arranged in an ear of a user of the second communications device. The method may additionally or alternatively comprise detecting, e.g. by a sensor comprised in the at least one earphone, that the at least one earphone is arranged in the ear of the user, and notifying, by the at least one earphone, the second communications device that the at least one earphone is arranged in the ear of the user.

The method according to the first aspect may further comprise one or more of receiving a first notification from the second communications device indicating that at least one earphone is wirelessly connected to the second communications device, receiving a second notification from the second communications device indicating that no earphone is wirelessly connected to the second communications device, receiving a third notification from the second communications device indicating that the at least one earphone is arranged in the ear of the user, receiving a fourth notification from the second communications device indicating that no earphone is arranged in any ear of the user, receiving a fifth notification from the second communications device indicating that the second communications device is available, receiving a sixth notification from the second communications device indicating that the second communications device is unavailable, storing a first status at a server indicating whether the second communications device is available, and storing a second status at the second communications device indicating whether the second communications device is available.

The method according to the first aspect may further comprise refraining from playing the audio stream relating to real time voice communication from the first communications device to the second communications device or refraining from playing the audio stream relating to real time voice communication in the second communications device on condition that it is determined that the second communications device is not set to route the audio stream relating to real time voice communication to any earphone is wirelessly connected to the second communications device.

The method according to the first aspect may further comprise transmitting a seventh notification to the second communications device indicating that the first communications device requests to transmit and play the audio stream relating to real time voice communication at the second communications device. An eighth notification indicating whether the second communications device is available may then be received from the second communications device.

The at least one earphone may be wirelessly connected to the second communications device via Bluetooth or any other current or future technology standard for wireless connection.

The method may further comprise establishing a voice communication session between the first communications device and the second communications device.

Establishing the voice communication session may comprise creating a communications channel and adding the first communications device and the second communications device to the communications channel. The transmitting of the audio stream relating to real time voice communication from the first communications device to the second communications device may then be performed based on said communications channel.

According to a second aspect, a non-transitory computer-readable storage medium is provided having stored thereon instructions for implementing the method according to the first aspect when executed in a system having processing capability.

The above-mentioned optional features of the method according to the first aspect, when applicable, apply to the a non-transitory computer-readable storage medium of the third aspect as well. To avoid undue repetition, reference is made to the above.

According to a third aspect, a method performed by a second communications device is provided. A first notification indicating that the second communications device is set to route an audio stream relating to real time voice communication to at least one earphone that is wirelessly connected to the second communications device is received, and, upon receipt of the first notification, at least one of: transmitting a second notification to a server indicating that the second communications device is available for receiving and playing a first audio stream relating to real time voice communication, and storing a status in the second communications device indicating that the second communications device is available for receiving and playing a first audio stream relating to real time voice communication is performed.

The method according to the third aspect may further comprise receiving a third notification indicating that a first communications device is transmitting a first audio stream relating to real time voice communication to the second communications device, and receiving the first audio stream from the first communications device. The method may then further comprise playing the first audio stream in the at least one earphone that is wirelessly connected to the second communications device.

The method according to the third aspect may further comprise receiving a first user input indicating that the user of the second communications device wants to transmit and play a second audio stream relating to real time voice communication to the first communications device, and transmitting the second audio stream from the second communications device to the first communications device.

The method according to the third aspect may further comprise, upon receipt of one or more of: a second user input indicating that the user is unavailable for receiving and playing the first audio stream relating to real time voice communication; a fourth notification indicating that no earphone is wirelessly connected to the communications device; and a fifth notification indicating that no earphone is arranged in an ear of the user of the second communications device, performing at least one of: transmitting a sixth notification to the server indicating that the second communications device is unavailable for receiving and playing the first audio stream relating to real time voice communication, and storing a status at the communications device indicating that the second communications device is unavailable for receiving and playing the first audio stream relating to real time voice communication.

According to a fourth aspect, a non-transitory computer-readable storage medium is provided having stored thereon instructions for implementing the method according to the method according to the third aspect when executed in a device having processing capability.

The above-mentioned optional features of the method according to the third aspect, when applicable, apply to the a non-transitory computer-readable storage medium of the fourth aspect as well. To avoid undue repetition, reference is made to the above.

According to a fifth aspect, a system for managing a request to transmit and play an audio stream relating to real time voice communication between a first communications device and a second communications device is provided. The system comprises circuitry configured to execute a receiving function, a determining function, and a playing function. The receiving function is configured to receive a request to transmit and play an audio stream relating to real time voice communication from a first communications device to a second communications device. The determining function is configured to determine whether the second communications device is available for receiving and playing the audio stream relating to real time voice communication, wherein the second communications device is determined to be available on condition that the second communications device is set to route the audio stream relating to real time voice communication to at least one earphone that is wirelessly connected to the second communications device. The playing function is configured to play the audio stream relating to real time voice communication in the at least one earphone on condition that it is determined that the second communications device is available.

The above-mentioned optional features of the method according to the first aspect, when applicable, apply to the system of the fifth aspect as well. To avoid undue repetition, reference is made to the above.

According to a sixth aspect, a second communications device is provided. The second communications device comprises circuitry configured to execute a receiving function and a transmitting and/or storing function. The receiving function is configured to receive a first notification indicating that the second communications device is set to route an audio stream relating to real time voice communication to at least one earphone is wirelessly connected to the second communications device. The transmitting and/or storing function is configured to, upon receiving the first notification perform at least one of: transmitting a second notification to a server indicating that the second communications device is available for receiving and playing a first audio stream relating to real time voice communication and storing a status indicating that the second communications device is available for receiving and playing the first audio stream relating to real time voice communication.

The above-mentioned optional features of the method according to the third aspect, when applicable, apply to the communications device of the sixth aspect as well. To avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the devices described or acts of the methods described as such devices and methods may vary. It is also to be understood that the terminology used herein is for purpose of describing particular embodiments only and is not intended to be limiting.

It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

Figure 1:
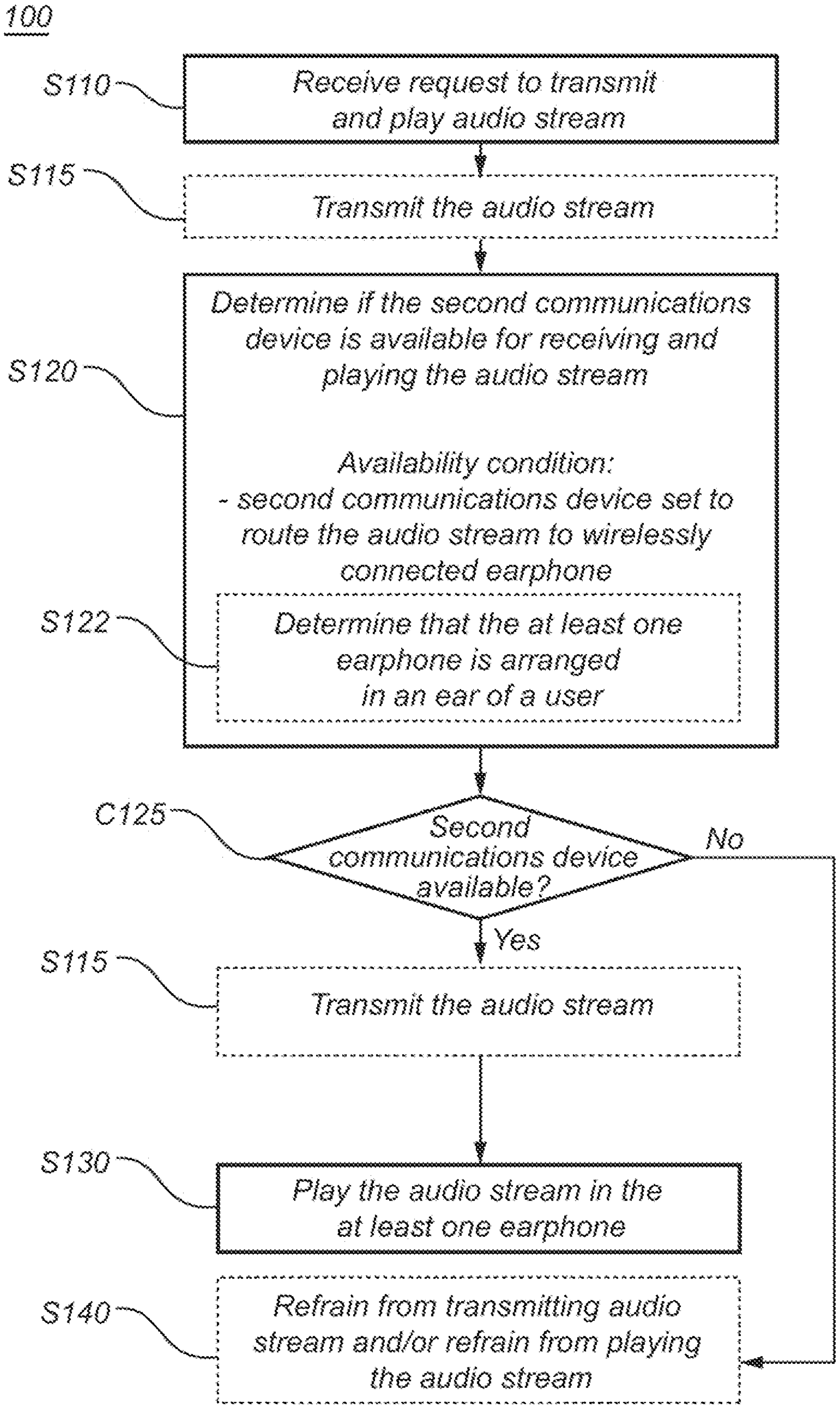
FIG. 1 shows a flow chart in relation to embodiments of a method for managing a request to transmit and play an audio stream relating to real time voice communication.

The present invention will now be described hereinafter with reference to the accompanying drawings, in which currently preferred embodiments of the invention are illustrated. This invention may, however, be embodied in many different forms and should not be construed as limited to the embodiments set forth herein. Features of methods, devices and systems included in dashed line boxes are optional. Numbering of similar features as first, second, third etc. is only intended to distinguish the features from each other and does not reflect any order, priority, or other relation between the features.

The invention is applicable in scenarios where voice communication is to be established between two or more communications devices, such as between a first communications device and a second communications device. The invention is based on a recognition that a user of the second communications device may not want to be required to interact with the second communications device, e.g. by providing user input to the second communications device at the time of establishing the voice communication, in order for the voice communication to be established and that the user instead may set the availability of the second communications device for receiving and playing an audio stream relating to real time voice communication in advance. Hence, if the second communications device has been set as available in advance either in a remote server or locally in the second communications device, when a request for transmitting and playing the audio stream relating to real time voice communication is received from the first communications device, e.g. to the remote server or to the second communications device, the audio stream relating to real time voice communication can be transmitted to and played at the second communications device without any further actions required from the user. The availability may be set directly by the user, e.g. by user input into the second communications device indicating that the second communications device is available for receiving and playing an audio stream relating to voice communication, or it may be set indirectly by the user, e.g. by the user wirelessly connecting at least one earphone to the second communications device and the second communications device being considered to be available on condition that at least one earphone is wirelessly connected to the second communications device.

The first communications device and the second communications device may be any type of communications device to which earphones may be wirelessly connected and which can be used for voice communication over a digital communications network. For example, the first communications device and the second communications device may be a smartphone such as an iPhone, an Android phone or any other type of smartphone, a wearable such as an Apple Watch etc., or it may be a computer such as a laptop etc. or a tablet such as an iPad etc. The first communications device and second communications device may be of the same type or of different types.

The audio stream may be transmitted based on any type of communications channel, service, framework or protocol that is applicable to the first communications device and the second communications device. For example, a channel using LiveKit (https://livekit.io) may be used. Other types of communication solutions may be used e.g. based on communication frameworks or protocols (either peer-to-peer or not) such as WebRTC, or other voice providers such as Agora (https://www.agora.io/en/) or Twilio (https://www.twilio.com/en-us).

One example of a condition for determining that the second communications device is available for receiving and playing the audio stream relating to real time voice communication of the second communication device in advance is that the second communication device is set to route the audio stream relating to real time voice communication to at least one earphone. To this end, FIG. 1 shows a flow chart in relation to embodiments of a method 100 for managing a request to transmit and play an audio stream relating to real time voice communication received from a first communications device to a second communications device.

The at least one earphone may be of any type that may be wirelessly connected to a communications device. For example, the at least one ear phone may be one of a pair of earphones that may be wirelessly connected to a communications device separately or it maybe a earphones that are wirelessly connected in a pair to a communications device. The at least one earphone may further be one of types that are worn in the ear, around the ear, on the ear, and over ear. The at least one earphone is not limited to any type of transmission of the audio to the users inner ear but may for example be both a type that provides the audio via the users ear canal or a type that provides the audio via bone conduction. Instead it is relevant that the audio is provided such that it is intended to be provided to the user only such that persons in the vicinity of the user cannot distinguish details of the audio. The at least one earphone may further be one of a pair of earphones that are possible to use one at a time. Examples of earphones are Apple's Airpods and Airpods Pro or similar current or future earphones.

The present disclosure generally relates to scenarios where the at least one earphone is wirelessly connected to the second communications device. However, the methods, devices and systems described herein are also applicable to the at least one earphone being connected via wire connection to the second communications device, as long as such initiation, and preferably also termination, of such wire connection can be detected in the second communications device.

The steps of the method 100 may be performed in the second communications device or may be distributed between the second communications device and a server remotely located from the second communications device. The server may for example be or include a database.

In the method 100 a request from a first communications device to transmit and play an audio stream relating to real time voice communication to the second communications device is received S110. It is further determined S120 whether the second communications device is available for receiving and playing the audio stream relating to real time voice communication. Specifically, the second communications device is determined to be available for receiving and playing the audio stream relating to real time voice communication on condition that the second communications device is set to route the audio stream relating to real time voice communication to at least one earphone that is wirelessly connected to the second communications device. On condition C125 that it is determined that the second communications device is available for receiving and playing the audio stream relating to real time voice communication, the audio stream relating to real time voice communication is played S130 in the at least one earphone that is wirelessly connected to the second communications device. Hence, by allowing the audio stream relating to real time voice communication to be played in the at least one earphone on condition that the second communications device is available, no further action from a user of the second communications device is required for the audio stream relating to real time voice communication to be played in the at least one earphone. Furthermore, the second communications device will be determined to be available for receiving and playing the audio stream relating to voice communication on condition that the second communications device is set to route the audio stream relating to real time voice communication to the at least one earphone that is wirelessly connected to the second communications device. A user may thus set in advance that the second communications device is available for receiving and playing the audio stream relating to real time voice communication by setting the second communications device is set to route the audio stream relating to real time voice communication to the at least one earphone wirelessly connected to the second communications device. The second communications device may be configured, e.g. in the operative system of the second communications device or within an app on the second communications device, to set the second communications device to route the audio stream relating to real time voice communication to the at least one earphone if the at least one earphone is wirelessly connected to the second communications device. The user may thus set the second communications device to route the audio stream relating to real time voice communication to the at least one earphone by wirelessly connecting the at least one earphone to the second communications device. Alternatively, the second communications device may be configured, e.g. in the operative system of the second communications device or within an app on the second communications device, to set the second communications device to route the audio stream relating to real time voice communication to the at least one earphone if the at least one earphone is wirelessly connected to the second communications device and also arranged in an ear of the user of the second communications device. The user may thus set the second communications device to route the audio stream relating to real time voice communication to the at least one earphone by wirelessly connecting the at least one earphone to the second communications device and arranging the at least one earphone in the ear of the user. Using the condition that the second communications device is set to route the audio stream relating to real time voice communication to the at least one earphone that is wirelessly connected to the second communications device is based on the recognition that when this is the case, the audio stream will then be played in the at least one earphone and hence it is not likely that any one else than the user will hear the audio stream or at least not distinguish any content of the audio stream.

By the communications device being 'set to' route the audio stream relating to real time voice communication to the at least one earphone is meant here any way of configuring or otherwise control the communications device to route the audio stream relating to real time voice communication to the at least one earphone. Hence, it is sufficient to ensure that the audio stream relating to real time voice communication will, in the communications device, be routed to the at least one earphone for the communications device to be determined S120 to be available for receiving and playing the audio stream relating to real time voice communication.

Availability of the second communications device may be updated automatically when the second communications device is set to route the audio stream relating to real time voice communication to the at least one earphone. Hence, the availability of the second communications device may be updated automatically when the at least one earphone is wirelessly connected to the second communications device such that when the second communications device detects that at least one earphone is wirelessly connected to the second communications device, the second communications device is determined to be available for receiving and playing the audio stream relating to real time voice communication. Alternatively, the availability of the second communications device may be updated automatically when the at least one earphone is wirelessly connected to the second communications device and/or arranged in the ear of the user of the second communications device, such that when the second communications device detects that at least one earphone is wirelessly connected to the second communications device and/or detects that at least one earphone is arranged in the ear of the user of the second communications device, the second communications device is determined to be available for receiving and playing the audio stream relating to real time voice communication. As the at least one earphone is wireless, detection in the second communications device that the at least one earphone is arranged in the ear of the user of the second communications device also implies that the at least one earphone is wirelessly connected to the second communications device. Hence, when the at least one earphone the second communication device detects that the at least one earphone is arranged in the ear of the user of the second communications device, the second communications device may be determined to be available for receiving and playing the audio stream relating to real time voice communication. This may for example be implemented by means of an app in the second communications device which receives a notification from the second communications device when the second communications device is set to route the audio stream relating to real time voice communication to the at least one earphone, such as upon wireless connection of the at least one earphone to the second communications device and/or upon detection that the at least one earphone is arranged in the ear of the user of the second communications device. Upon detecting that the second communications device is set to route the audio stream relating to real time voice communication to the at least one earphone, e.g. by detecting that at least one earphone becomes wirelessly connected to the second communications device and/or that the at least one earphone becomes arranged in the ear of the user of the second communications device, the app will perform an action such as one or both of storing a status locally in the second communications device indicating that the second communications device is available for receiving and playing the audio stream relating to real time voice communication and transmitting a notification indicating that the second communications device is available for receiving and playing the audio stream relating to real time voice communication to a server in which a status may then be stored indicating that the second communications device is available for receiving and playing the audio stream relating to voice communication. Automatically storing a status indicating availability or transmitting a notification to a server for storing a status indicating availability may be configured for an iPhone by means of Shortcuts (https://developer-.apple.com/documentation/appintents/app-shortcuts) and Automation (https://support.apple.com/en-gb/guide/shortcuts/apdfbdbd7123/7.0/ios/17.0). In alternative to storing the status locally in the second communications device or in the server, a check may be made in real time whether the second communications device is set to route the audio stream relating to real time voice communication to the at least one earphone, e.g. by checking in real time whether the at least one earphone is wirelessly connected to the second communications device and/or whether the at least one earphone is arranged in the ear of the user of the second communication device, each time a request for receiving and playing the audio stream relating to real time voice communication is received.

The method may further comprise transmitting S115 the audio stream relating to real time voice communication to the second communications device before the second communications device plays S140 the audio stream in the at least one earphone. The transmitting S115 the audio stream may be performed before or after determining S120 if the second communications device is available for receiving and playing the audio stream. If the audio stream is transmitted S115 before S120 determining S120 if the second communications device is available for receiving and playing the audio stream, the audio stream will be transmitted from the first communications device and received in the second communication device but only played on condition that the second communications device is determined to be available for receiving and playing the audio stream. In alternative, the transmitting S115 the audio stream may be performed only after it has been determined that the second communications device is determined to be available for receiving and playing the audio stream. Hence, by being available for receiving and playing the audio stream in effect means being available for playing the audio stream. Playing the audio stream may be controlled by either controlling the transmission, such that stopping transmission will also effectively stop playing of the audio stream, or controlling the playing only, such that transmission may be allowed but only the playing is then controlled.

The audio stream relating to real time voice communication from the first communications device to the second communications device is typically real time speech from the user of the first communications device to the second communications device. Hence, when a user of the first communications device transmits a request to transmit and play the audio stream relating to voice communication to the second communications device, and the second communications device is available, the audio stream relating to voice communication is transmitted and played in the at least one earphone, such that the user of the first communications device may talk directly to the user of the second communications device.

The second communications device may be configured such that no audio stream is transmitted from the second communications device to the first communications device as a default upon receipt and playing of the audio stream relating to real time voice communication in the at least one earphone. In alternative, a muted, empty, or constant audio stream may be transmitted S115 from the second communications device to the first communications device as a default upon receipt and playing of the audio stream relating to real time voice communication in the at least one earphone. In either alternative, no audio from the user of the second device is initially transmitted to the first communications device. The user of the second device may then enable transmission of a further audio stream from the second communications device to the first communications device by means of a user input directly on the second communications device or on the at least one earphone. The user input may for example be pressing a button on a touch screen of the first communications device or pressing a button on the at least one earphone. The further audio stream includes real time audio in relation to voice communication from the second communications device to the first communications device, such as real time speech from the user of the second communications device to the first communications device. In alternative, the second communications device may be configured such that the further audio stream may be transmitted from the second communications device to the first communications device directly upon receipt and playing of the audio stream relating to real time voice communication as a default, i.e. without the need for any user input, such that audio from the user of the second communications device is transmitted to the first communications device. The former may be preferred as the user of the second device may not be aware that the voice communication has been enabled before the user of the first communications device has started to talk. However, a default sound may be played in the at least one earphone before receipt and playing of the audio stream relating to real time voice communication in order to indicate that real time voice communication has been enabled.

The method may further comprise establishing a voice communication session between the first communications device and the second communications device.

Establishing the voice communication session may further comprise creating a communications channel, adding the first communications device and the second communications device to the communications channel, and transmitting the audio stream relating to real time voice communication, and optionally also the further audio stream, from the first communications device to the second communications device based on said communications channel.

The at least one earphone may send a wireless notification to the second communications device indicating whether or not it is arranged in an ear of a user of the second communications device. Since it is implicit from such a wireless notification that the at least one earphone is wirelessly connected to the second communications device, determining, e.g. by receipt of a notification, that the at least one earphone is arranged in the ear of the user of the second communication device means that the at least one earphone is wirelessly connected to the second communications device. Furthermore, the at least one earphone being arranged in the ear of the user of the second communications device and being wirelessly connected to the second communications device will in some scenarios imply that the second communications device is set to route any audio stream to the at least one earphone. Hence, determining, e.g. by receipt of a notification, that the at least one earphone is arranged in the ear of the user of the second communication device may be used as the only condition to determine that the second communications device is available for receiving and playing the audio stream relating to real time voice communication.

Alternatively, a silent audio file may be played on the second communications device. By determining whether the silent audio file is played through the speaker or through the at least one earphone via a wireless connection, it can be determined whether the second communications device is set to route the audio stream relating to real time voice communication to the at least one earphone that is wirelessly connected to the second communications device. This may for example be implemented by listening to audio session route changes or identifying the current audio session route in an iPhone (https://developer.apple.com/documentation/avfaudio/responding_to_audio_route_changes) or similar current or future functions in iPhones or other types smartphones based on other operating systems such as Android etc.

The second communications device may be determined to be available on condition that the at least one earphone is arranged in an ear of the user of the second communications device. This is beneficial since, when the at least one earphone that is wirelessly connected to the second communications device is also arranged in an ear of the user of the second communications device, it is ensured that the user will hear the audio stream relating to real time voice communication played in the at least one earphone. A sensor comprised in the at least one earphone may then be used to detect that the at least one earphone is arranged in the ear of a user and the second communications device may be notified by the at least one earphone that the at least one earphone is arranged in the ear of the user. Alternative ways of determining whether at least one earphone is arranged in the ear of a user are feasible.

Additionally, the second communications device may be determined to be available on a further condition that the at least one earphone wirelessly connected to the second communications device is one of a particular pair of earphones paired to the second communications device. Hence, availability may be set in relation to whether or not at least one earphone of a particular pair of earphones is wirelessly connected to the second communications device. Thus the user may select to be available using the particular pair of earphones.

As indicated hereinabove, the steps of the method 100 may all be performed in the second communications device or they may be distributed between the second communications device and a server remote from the second communications device. In the former case, the method 100 may further comprise storing a second status at the second communications device indicating whether the second communications device is available. The status will be updated based on whether the condition that at least one earphone is wirelessly connected to the second communications device and the optional further condition that the at least one earphone is arranged in the ear of the user is fulfilled. In alternative, a check may be made in real time in the second communications device whether or not the second communications device is available. In the latter case, the method 100 may further comprise storing a first status at a server indicating whether the second communications device is available. The status will be updated based on whether the condition that the second communications device is set to route the audio stream relating to real time voice communication to the at least one earphone that is wirelessly connected to the second communications device. The availability of the second communications device may be determined in the server based on receiving a first notification from the second communications device indicating that at least one earphone is wirelessly connected to the second communications device, receiving a second notification from the second communications device indicating that no earphone is wirelessly connected to the second communications device, receiving a third notification from the second communications device indicating that the at least one earphone is arranged in the ear of the user, receiving a fourth notification from the second communications device indicating that no earphone is arranged in any ear of the user, receiving a fifth notification from the second communications device indicating that the second communications device is available, receiving a sixth notification from the second communications device indicating that the second communications device is unavailable. The notifications need only be received at change of availability, e.g. upon the second communications device is set to route the audio stream relating to real time voice communication to the at least one earphone, upon the at least one earphone becoming wirelessly connected to the second communications device, upon disconnecting a last of the at least one earphone from the second communications device, upon arranging the at least one earphone in the ear of the user, upon removing a last of the at least one earphone from an ear of the user, upon the second communications device becoming available, and upon the second communications device becoming unavailable. The server may also pool requests frequently to clients via for example silent push notifications to check for earphones.

When some steps are performed in a server remote from the second communications device, the method 100 may further comprise transmitting a notification to the second communications device indicating that the first communications device requests to transmit and play the audio stream relating to real time voice communication. A notification indicating whether the second communications device is available may then be received from the second communications device. This notification is received if a real time check is made in the second communications device whether or not the second communications device is set to route the audio stream relating to real time voice communication to the at least one earphone that is wirelessly connected to the second communications device when the request for transmitting and playing the audio stream relating to voice communication is received, or if a status is stored in the second communications device indicating whether the second communications device is available. In alternative, a status may be stored at the server indicating whether the second communications device is available.

The method 100 may further comprise refraining S140 from transmitting the audio stream relating to real time voice communication and/or refraining from playing the audio stream in the at least one earphone on condition that it is determined that the second communications device is unavailable for receiving and playing the audio stream relating to real time voice communication, wherein the second communications device is unavailable on condition that the second communications device is not set to route the audio stream relating to real time voice communication to any no earphone is wirelessly connected to the second communications device. In other words, the method 100 may further comprise refraining S140 from transmitting and/or playing the audio stream relating to real time voice communication on condition that no earphone is wirelessly connected to the second communications device. The second communications device may further be unavailable on condition that no earphone is arranged in any ear of the user. In other words, the method 100 may further comprise refraining S140 from transmitting and/or playing the audio stream relating to real time voice communication on condition that no earphone is arranged in any ear of the user.

The method 100 may further comprise refraining S140 from transmitting the audio stream relating to real time voice communication and/or refraining from playing the audio stream in the at least one earphone on condition that it is determined that the second communications device is unavailable for receiving and playing the audio stream relating to real time voice communication, wherein the second communications device is unavailable on condition that the second communications device is set to route the audio stream relating to real time voice communication to a loudspeaker of the phone or a loudspeaker that is wirelessly connected to the second communications device.

Additionally, the second communications device may be determined to be unavailable on condition that no earphone one of a particular pair of earphones paired to the second communications device is wirelessly connected to the second communications device. This may be combined with the second communications device being determined to be available on condition that the at least one earphone wirelessly connected to the second communications device is one of the particular pair of earphones paired to the second communications device. Hence, availability and unavailability may be set in relation to whether or not at least one earphone of a particular pair of earphones is wirelessly connected to the second communications device. Thus the user may select to be available using the particular pair of earphones and to be unavailable by not using any earphones or another pair of earphones than the particular pair.

In addition to refraining S140 from transmitting and/or playing the audio stream relating to real time voice communication on condition that it is determined that the second communications device is unavailable, a notification, such as a voice, sound, or text message or other type of notification, may be received in the second communications device. The notification may indicate that a request for transmitting and/or playing the audio stream relating to real time voice communication from the first communications device has been rejected, and may further include information regarding the user of the first communications device, a time of the request etc. In addition or in alternative, the first communications device may automatically request to transmit and play the audio stream relating to voice communication using another application or service, such as voice over IP or a standard cellular network voice call, etc. which requires the user of the second communications device to accept the request actively, e.g. by pressing a button on a touchscreen of the second communications device, before voice communication is initiated. In addition or in alternative, the user of the second communications device may be provided the option to accept playing of the audio stream relating to real time voice communication in the second communications device even if the second communications device is not set to route the audio stream relating to real time voice communication to at least one earphone that is wirelessly connected to the second communications device. Such acceptance may for example be provided by means of user input to the second communications device.

Additionally, the method 100 may include a bypass step in which the user of the second communications device may provide input to enable playing of the audio stream even if the second communications device is not set to route the audio stream to at least one wirelessly connected earphone. The bypass step may for example be performed by the user providing input to the second communications device setting a status of the second communications device as available for receiving and playing the audio stream in the second communications device even if the second communications device is not set to route the audio stream to at least one wirelessly connected earphone. In alternative, the bypass step may be performed by the user providing input at receipt of a request to transmit and play an audio stream enabling playing of the audio stream in the second communications device indicating that the audio stream may be played in the second communications device even if the second communications device is not set to route the audio stream to at least one wirelessly connected earphone. The audio stream will after such a bypass step play the audio stream in the second device, e.g. in a loudspeaker of or connected to the second communications device.

The at least one earphone may be wirelessly connected to the second communications device via Bluetooth or any other similar current or future earphones technology standard for wireless connection.

It is to be noted that whether or not a communications device is set to route the audio stream relating to real time voice communication to at least one earphone that is wirelessly connected is typically only relevant in relation to the communications device to which the request for transmitting and playing the audio stream relating to real time voice communications is sent, i.e. the second communications device. The requesting communications device, i.e. the first communications device, does not need not have any earphone wirelessly connected.

Furthermore, the method 100 has been described in relation to a first communications device and a second communications device. However, this may also be applied to a first communications device sending a request for transmitting and playing the audio stream relating to real time voice communications to a plurality of communications devices. In such a case, the availability checked in each of the plurality of communications devices as described for the second communications device. The audio stream relating to real time voice communication may then be transmitted and played in the communications devices of the plurality of communications devices that are available.

As indicated hereinabove, a user may set the availability of the second communications device for receiving and playing the audio stream relating to voice communication in advance. Such an availability may be set e.g. based on whether or not the second communications device is set to route the audio stream relating to real time voice communication to the at least one earphone that is wirelessly connected to the second communications device as described in relation to FIG. 1. However, as also mentioned other way to set the availability are possible. For example, a user of the second communications device may set the second communications device as available or unavailable by means of user input. Such user input may for example be through an app. Additionally, or alternatively, the user of the second communications device may provide user input that identifies one or more contacts in the second communications device, such that the second communications device will always be available each time a request for transmitting and playing an audio stream relating to real time voice communication comes from a communications device of one of the identified contacts. Additionally, or alternatively, the user of the second communications device may provide user input that identifies one or more identified locations for the second communications device, such that the second communications device will always be available each time a request for transmitting and playing the audio stream relating to real time voice communications is received when the second communications device is located at of one of the one or more identified locations.

In another aspect, the second communications device may be the at least one earphone itself or the at least one earphone may be an integral part of the second communications device. In such a case the audio stream will be played as long as the user is wearing the second device. In such a case a method for managing a request to transmit and play an audio stream relating to real time voice communication may be provided, which method comprises receiving the request to transmit and play an audio stream relating to real time voice communication from a first communications device to a second communications device. The method further comprises determining whether the second communications device is available for receiving and playing the audio stream relating to real time voice communication, wherein the second communications device is determined to be available on condition that the second communications device is set to route the audio stream relating to real time voice communication to at least one earphone of the second communications device. On condition that the second communications device is determined to be available, the audio stream relating to real time voice communication is played in the at least one earphone. The second communications device may be set to route the audio stream relating to real time voice communication to at least one earphone of the second communications device if the second communications device is worn by a user of the second communications device. This may for example be detected if the at least one earphone is arranged in an ear of the user.

Figure 2:
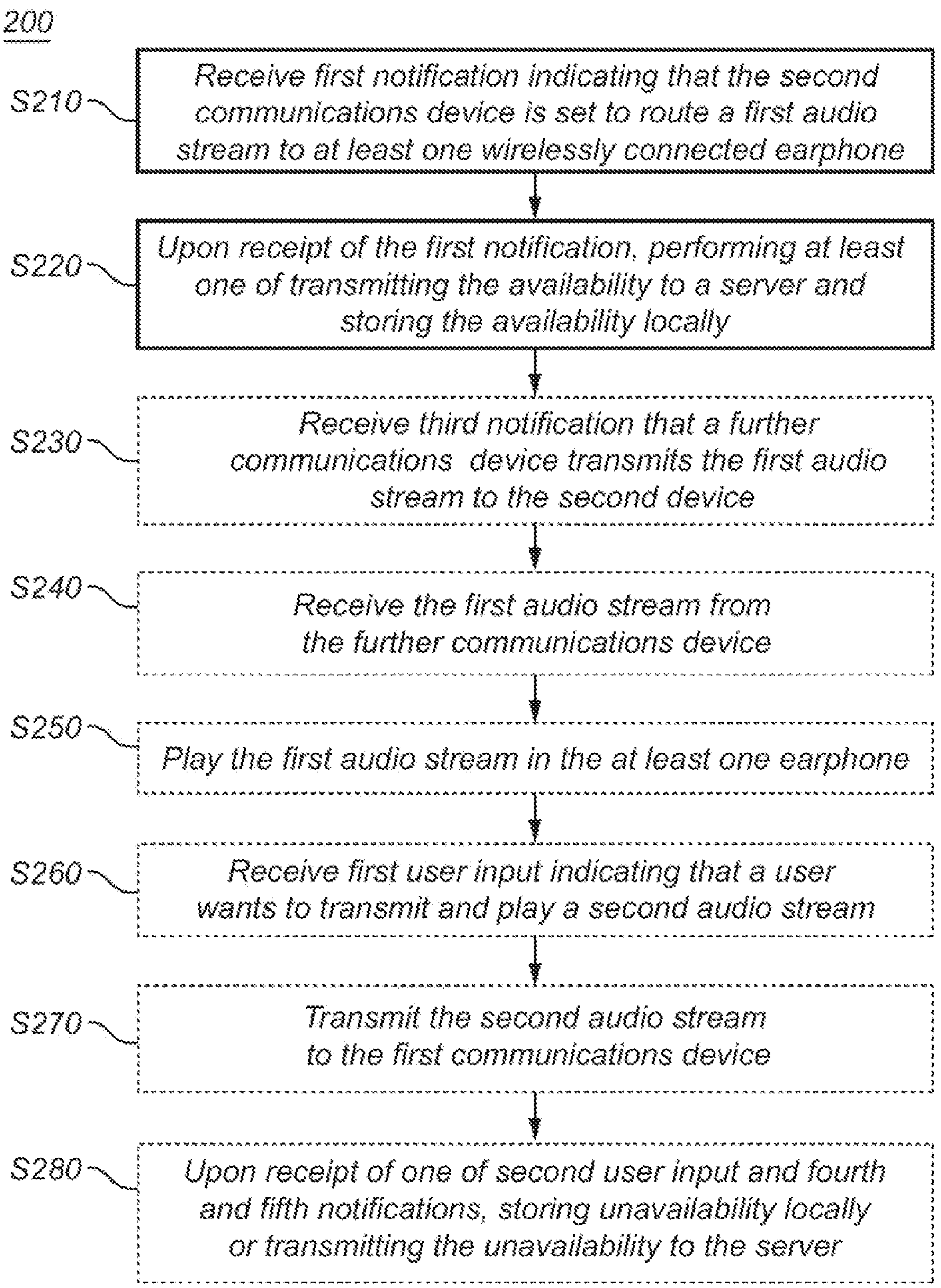
FIG. 2 shows a flow chart in relation to embodiments of a method for transmitting an availability notification and/or storing an availability status.

Embodiments of a method 200 for transmitting an availability notification performed by a communications device will now be described with reference to FIG. 2. In the following "a/the communications device" corresponds to "a/the second communications device" in relation to FIG. 1 and "a/the further communications device" corresponds to "a/the first communications device" in relation to FIG. 1.

The method 200 comprises receiving S210 a first notification indicating that the communications device is set to route a first audio stream relating to real time voice communication to at least one earphone that is wirelessly connected to the communications device. Upon receipt of the first notification, at least one of the following is performed S220:

- transmitting a second notification to a server indicating that the communications device is available for receiving and playing a first audio stream relating to real time voice communication, and
- storing a status in the communications device indicating that the communications device is available for receiving and playing a first audio stream relating to real time voice communication.

The first notification may for example be received in an app installed in the communications device which receives such a first notification each time the communications device is set to route a first audio stream relating to real time voice communication to at least one earphone. The first notification may be provided automatically each time the communications device is set to route a first audio stream relating to real time voice communication to the at least one earphone. For example, it may be determined that the communications device is set to route a first audio stream relating to real time voice communication to the at least one earphone, when the at least one earphone is wirelessly connected to the second communications device. The first notification may also be provided in response to a question to whether the communications device is set to route a first audio stream relating to real time voice communication to the at least one earphone, e.g. by a question whether the at least one earphone is wirelessly connected to the second communications device. The first notification may for example be received from the operative system of the second communications device. Alternatively, a silent audio file may be played on the second communications device. By determining whether the silent audio file is played through the speaker or through the at least one earphone via a wireless connection, it can be determined whether the second communications device is set to route the audio stream relating to real time voice communication to the at least one earphone that is wirelessly connected to the second communications device. The first notification is then the determining that the second communications device is set to route the audio stream relating to real time voice communication to the at least one earphone that is wirelessly connected to the second communications device. When the app receives the first notification it performs S220 at least one of transmitting the second notification to the server such that the server may e.g. store a status indicating that the communications device is available for receiving and playing a first audio stream relating to real time voice communication, and storing the status in the communications device indicating that the communications device is available for receiving and playing a first audio stream relating to real time voice communication. The communications device may be configured to transmit the first notification to the app in the second communications device upon wireless connection of the at least one earphone to the communications device if such wireless connection cause the communications device to be set to route a first audio stream relating to real time voice communication to the at least one earphone. The first notification may alternatively be sent to the app in the communications device as a response to a question if at least one earphone is wirelessly connected to the communications device. The question in turn may be sent each time a request for transmitting and playing the audio stream relating to real time voice communication is received in the communications device. The communications device may then be configured such that app performs one or both of transmitting the second notification to the server and storing the availability status locally in the communications device. When the second notification is transmitted to the server, a status may then be stored in the server indicating that the second communications device is available for receiving and playing a first audio stream relating to real time voice communication. An app automatically storing a status indicating availability and/or transmitting a notification to a server for storing a status indicating availability may be configured in an iPhone by means of Shortcuts (https://developer.apple.com/documentation/appintents/app-shortcuts) and Automation (https://support.apple.com/en-gb/guide/shortcuts/apdfbdbd7123/7.0/ios/17.0). In alternative to storing the status locally in the communications device or in the server, a check may be made in real time in the communications device whether or not the communications device is set to route the first audio stream relating to real time voice communication to the at least one earphone that is wirelessly connected to the communications device each time a request for transmitting and playing the audio stream relating to real time voice communication is received.

The method 200 may further comprise receiving S230 a third notification that a further communications device is transmitting the first audio stream relating to real time voice communication to the communications device based on the second notification. The communications device then receives S240 the first audio stream from the further communications device. The method 200 may then further comprise playing S250 the first audio stream in the at least one earphone that is wirelessly connected to the communications device.

The third notification may for example use a Push-To-Talk (PTT, Push to Talk, or pushtotalk) notification using the Push to Talk framework from Apple (https://developer.apple.com/documentation/pushtotalk). The further communications device may send the third notification based on receiving an indication from the server that the communications device is available for receiving and playing the first audio stream relating to real time voice communication e.g. using the same app as used in the communications device for transmitting S220 the second notification to the server.

The first audio stream relating to real time voice communication can be transmitted based on a channel, service, framework or protocol, e.g. using LiveKit and the communications device may connect to the channel and receive S240 the first audio stream from the further communications device. Other types of channels may be used e.g. based on communication frameworks or protocols (either peer-to-peer or not) such as WebRTC, or other providers such as Agora (https://www.agora.io/en/) or Twilio (https://www.twilio.com/en-us). As the at least one earphone is wirelessly connected to the communications device, the first audio stream will then typically be played S250 in the at least earphone.

The method 200 may further comprise receiving S260 a first user input indicating that the user of the communications device wants to transmit and play a second audio stream to the further communications device. The second audio stream is then transmitted S270 from the communications device to the further communications device. The second audio stream may for example be transmitted from the communications device to the further communications device based on the channel, e.g. using LiveKit. In alternative, a muted, empty, or constant audio stream may be transmitted from the second communications device to the first communications device as a default upon receiving S240 the first audio stream relating to real time voice communication. In either alternative, no audio from the user of the communications device is initially transmitted to the further communications device. Other types of channels may be used for transmitting the first audio stream and/or the second audio stream e.g. based on communication frameworks (either peer-to-peer or not) such as WebRTC, or other providers such as Agora (https://www.agora.io/en/) Twilio (https://www.twilio.com/en-us).

The method 200 may further comprise performing at least one of transmitting S280 a sixth notification to the server indicating that the communications device is unavailable for receiving and playing the first audio stream relating to real time voice communication, and storing S290 a status at the communications device indicating that the communications device is unavailable for receiving and playing the first audio stream relating to real time voice communication. The sixth notification is transmitted S290 and/or the status is stored S290 upon receipt of one or more of second user input indicating that the user is unavailable for receiving and playing the first audio stream relating to real time voice communication, a fourth notification indicating that no earphone is wirelessly connected to the communications device, and a fifth notification indicating that no earphone is arranged in an ear of the user of the communications device.

The first user input, the fourth notification, and/or the fifth notification may for example be received in the app installed on the communications device. When the app receives at least one of the first user input, the fourth notification, and the fifth notification, it performs at least one of transmitting the sixth notification to the server such that the server e.g. may store a status indicating that the communications device is unavailable for receiving and playing the first audio stream relating to real time voice communication, and storing the status in the communications device indicating that the communications device is unavailable for receiving and playing the first audio stream relating to real time voice communication.

The communications device may be configured to send the first notification to the app in the communications device. The first notification may for example be sent to the app upon wireless connection of the at least one earphone to the communications device and/or upon arranging the at least one earphone in an ear of the user of the communications device. The communications device may then be configured such that app performs one or both of transmitting the second notification indicating availability to the server and storing the status indicating availability locally in the communications device. When the second notification is transmitted to the server, a status may then be stored in the server indicating that the communications device is available for receiving and playing the first audio stream relating to real time voice communication. Storage in the server may be in any type of storage means and may include storing in a database. An app automatically storing a status indicating availability and/or transmitting a notification to a server for storing a status indicating availability upon receipt of the first notification may be configured in an iPhone by means of Shortcuts (https://developer.apple.com/documentation/appintents/app-shortcuts) and Automation (https://support.apple.com/en-gb/guide/shortcuts/apdfbdbd7123/7.0/ios/17.0).

Similarly, the communications device may be configured to send, to the app in the communications device, a notification indicating that the communications device is not set to route the first audio stream relating to real time voice communication to at least any earphone that is wirelessly connected to the second communications device. The notification may for example be sent to the app upon wireless disconnection of the at least one earphone to the communications device and/or upon removing the at least one earphone from an ear of the user of the communications device. The communications device may then be configured such that app performs one or both of transmitting the sixth notification indicating unavailability to the server and storing the status indicating unavailability locally in the communications device. When the sixth notification is transmitted to the server, a status may then be stored in the server indicating that the communications device is unavailable for receiving and playing the first audio stream relating to real time voice communication. Storage in the server may be in any type of storage means and may include storing in a database. An app automatically storing a status indicating unavailability and/or transmitting a notification to a server for storing a status indicating unavailability upon receipt of the first notification may be configured in an iPhone by means of Shortcuts (https://developer.apple.com/documentation/appintents/app-shortcuts) and Automation (https://support.apple.com/en-gb/guide/shortcuts/apdfbdbd7123/7.0/ios/17.0).

The second user input may be any input to the communications device that indicates that the user is unavailable for receiving and playing the first audio stream relating to real time voice communication. For example, it may be an input setting an unavailability status in an app or generally for the communications device.

The fourth notification may be sent to the app installed in the communications device upon a last earphone being disconnected from the communications device such that no earphone is wirelessly connected to the communications device.

The fifth notification may be sent to the app installed in the communications device upon a last earphone being removed from the ears of the user of the communications device such that no earphone is arranged in any of the ears of the user. Removal of an earphone from an ear of a user may be detected using a sensor in the earphone which then notifies the communications device that the earphone is removed. The communications device may then send the fifth notification to the app when a last earphone is removed.

Embodiments of a system 300 configured for managing a request to transmit and play an audio stream relating to real time voice communication will now be described with reference to FIGS. 3*a* and 3*b*. The method 100 described with reference to FIG. 1 and the method 200 described with reference to FIG. 2 may be implemented in the system 300. Hence, the description with reference to FIG. 1 and FIG. 2 is relevant also in relation to the system 300.

Figure 3A:
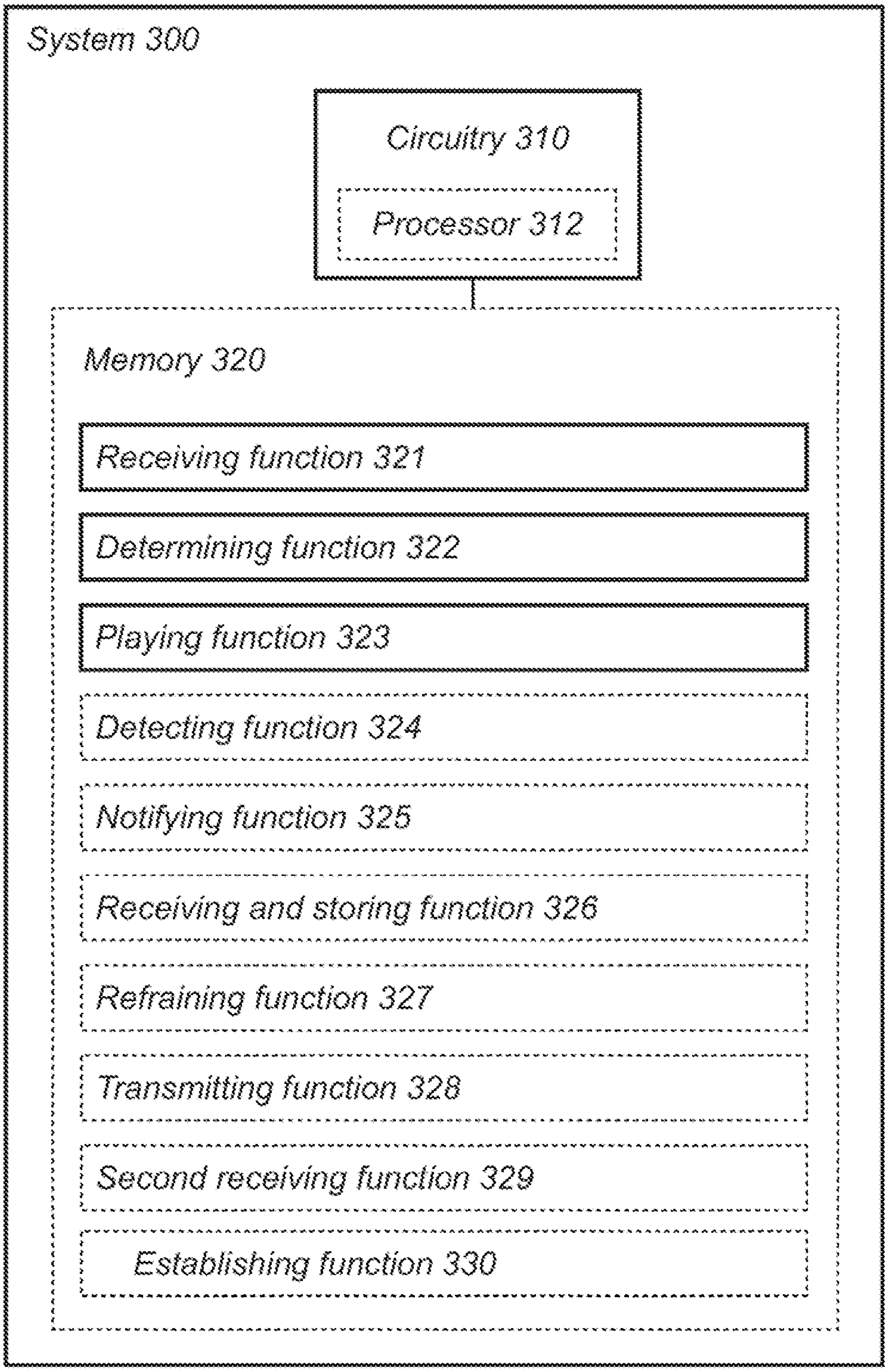
FIGS. 3*a* and 3*b* show schematic diagrams in relation to embodiments of a system configured for managing a request to transmit and play an audio stream relating to real time voice communication.

As illustrated in FIG. 3*a*, the system 300 comprises circuitry 310 configured to carry out functions of the system 300. The circuitry 310 may include one or more processors 312, such as a central processing unit (CPU), microcontroller, microprocessor etc. The one or more processors 312 are configured to execute program code such as program code configured to carry out the functions of the system 300.

The system 300 may further comprise one or more memories 320. The one or more memories 320 may be one or more of a buffer, a flash memory, a hard drive, a removable media, a volatile memory, a non-volatile memory, a random access memory (RAM), or another suitable device. In a typical arrangement, the one or more memories 320 may include a non-volatile memory for long term data storage and a volatile memory that functions as system memory for the circuitry 310. The memory 320 may exchange data with the circuitry 310 over a data bus. Accompanying control lines and an address bus between the one or more memories 320 and the circuitry 310 also may be present.

The functions of the system 300 may be embodied in the form of executable logic routines (e.g., lines of code, software programs, etc.) that are stored on one or more non-transitory computer readable mediums (e.g., the one or more memories 320) of the system 300 and are executed by the circuitry 310 (e.g., using the one or more processors 312). Furthermore, the functions of the system 300 may be a stand-alone software application or form a part of a software application that carries out additional tasks related to the system 300. The described functions may be considered a method that one or more processing units, e.g., the one or more processors 312 of the circuitry 310, are configured to carry out. Also, while the described functions may be implemented in software, such functionality may as well be carried out via dedicated hardware or firmware, or some combination of hardware, firmware and/or software.

The circuitry 310 of the system 300 is configured to execute a receiving function 321, a determining function 312, and a playing function 323.

The circuitry 310 of the system 300 is optionally configured to execute a detecting function 324, a notifying function 325, a receiving and storing function 326, a refraining function 327, a transmitting function 328, a second receiving function 329, and an establishing function 330.

The receiving function 321 is configured to receive the request from a first communications device to transmit and play an audio stream relating to real time voice communication to a second communications device.

The determining function 322 is configured to determine whether the second communications device is available for receiving and playing the audio stream relating to real time voice communication, wherein the second communications device is determined to be available on condition that the second communications device is set to route the audio stream relating to real time voice communication to at least one earphone that is wirelessly connected to the second communications device.

The playing function 323 is configured to play the audio stream relating to real time voice communication in the at least one earphone on condition that it is determined that the second communications device is determined to be available for receiving and playing the audio stream relating to real time voice communication.

The determining function 322 may be further configured to determine that the second communications device is set to route the audio stream relating to real time voice communication to the at least one earphone by determining that the at least one earphone is arranged in an ear of a user of the second communications device. The circuitry 310 may then be further configured to execute the detecting function 324 configured to detect, by a sensor comprised in the at least one earphone, that the at least one earphone is arranged in the ear of the user, and the notifying function 325 configured to notify, by the at least one earphone, the second communications device that the at least one earphone is arranged in the ear of the user.

The circuitry 310 may be further configured to execute the receiving and storing function 326 configured to perform one or more of:

- receiving a first notification from the second communications device indicating that at least one earphone is wirelessly connected to the second communications device,
- receiving a second notification from the second communications device indicating that no earphone is wirelessly connected to the second communications device, receiving a third notification from the second communications device indicating that the at least one earphone is arranged in the ear of the user, receiving a fourth notification from the second communications device indicating that no earphone is arranged in any ear of the user, receiving a fifth notification from the second communications device indicating that the second communications device is available for receiving and playing the audio stream relating to real time voice communication, receiving a sixth notification from the second communications device indicating that the second communications device is unavailable for receiving and playing the audio stream relating to real time voice communication, storing a first status at a server indicating whether the second communications device is available for receiving and playing the audio stream relating to real time voice communication, and storing a second status at the second communications device indicating whether the second communications device is available for receiving and playing the audio stream relating to real time voice communication.

The circuitry 310 may be further configured to execute the refraining function 327 configured to refrain from transmitting the audio stream relating to real time voice communication from the first communications device to the second communications device or refraining from playing the audio stream relating to real time voice communication in the second communications device on condition that it is determined that the second communications device is not set to route the audio stream relating to real time voice communication to any earphone that is wirelessly connected to the second communications device.

The circuitry 310 may be further configured to execute the transmitting function 328 configured to transmit a seventh notification to the second communications device indicating that the first communications device requests to transmit and play the audio stream relating to real time voice communication at the second communications device and optionally a second receiving function 329 configured to receive an eighth notification indicating whether the second communications device is available for receiving and playing the audio stream relating to voice communication from the first communications device.

The at least one earphone may be wirelessly connected to the second communications device via Bluetooth or any other similar current or future technology standard for wireless connection.

The circuitry may be further configured to execute the establishing function 330 configured to establish a voice communication session between the first communications device and the second communications device.

The establishing function 330 may further be configured to create a communications channel, to add the first communications device and the second communications device to the communications channel, and transmit the audio stream relating to real time voice communication from the first communications device to the second communications device based on said communications channel.

The above-mentioned optional features of the method according to the first aspect, when applicable, apply to the system of the fourth aspect as well. To avoid undue repetition, reference is made to the above.

Figure 3B:
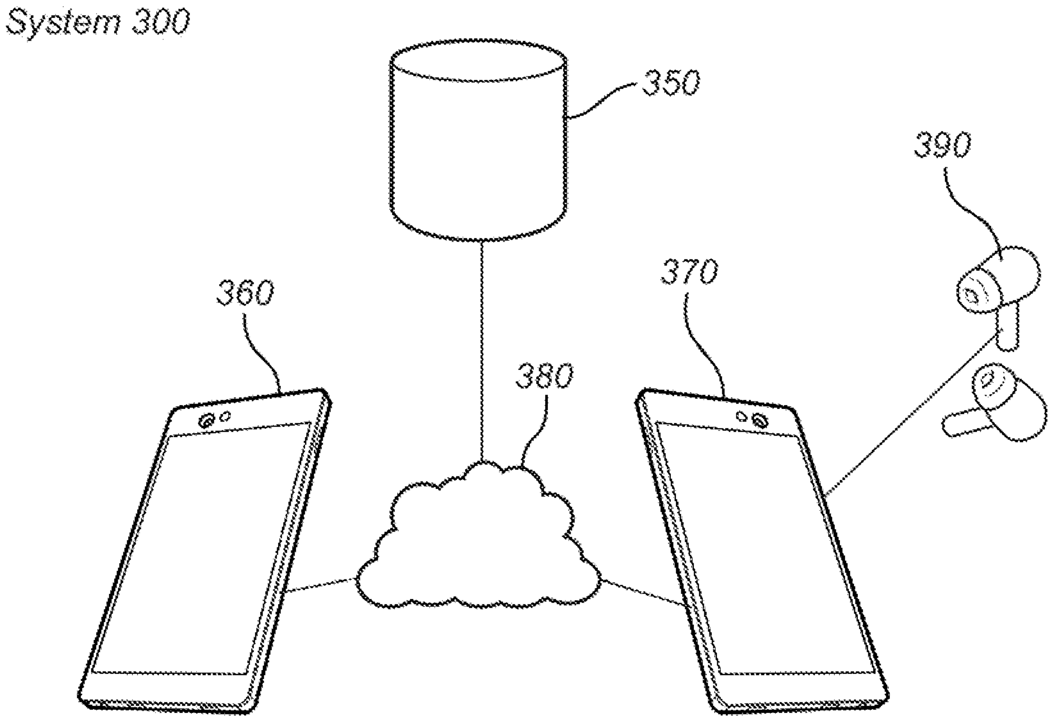

As illustrated in FIG. 3*b*, the system 300 may comprise a server 350, the further communications device 360, the communications device 370, a communications network 380 and at least one earphone 390. In different embodiments, the functions of the system may be performed in different devices of the system 300. For example, the receiving function 321 and the determining function 322 may both be executed by a circuitry 310 in the communications device 370. In alternative, these functions may both be executed by a circuitry 310 in the server 350. In the former alternative, the communications device 370 may determine locally whether at least one earphone is wirelessly connected to the second communications device. In the latter case, the server 350 needs to receive such information from the communications device 370 e.g. by means of a circuitry 310 at the server 350 executing the receiving and storing function 326. The in Hence, even if FIG. 3*a* only indicates a single circuitry 310, processor 312, and memory 320, these may represent separate circuitry 310, processor 312, and memory 320 located in the server 350, the further communications device 360, the communications device 370, the communications network 380 and the at least one earphone 390 respectively as will be understood by the skilled person.

Figure 4:
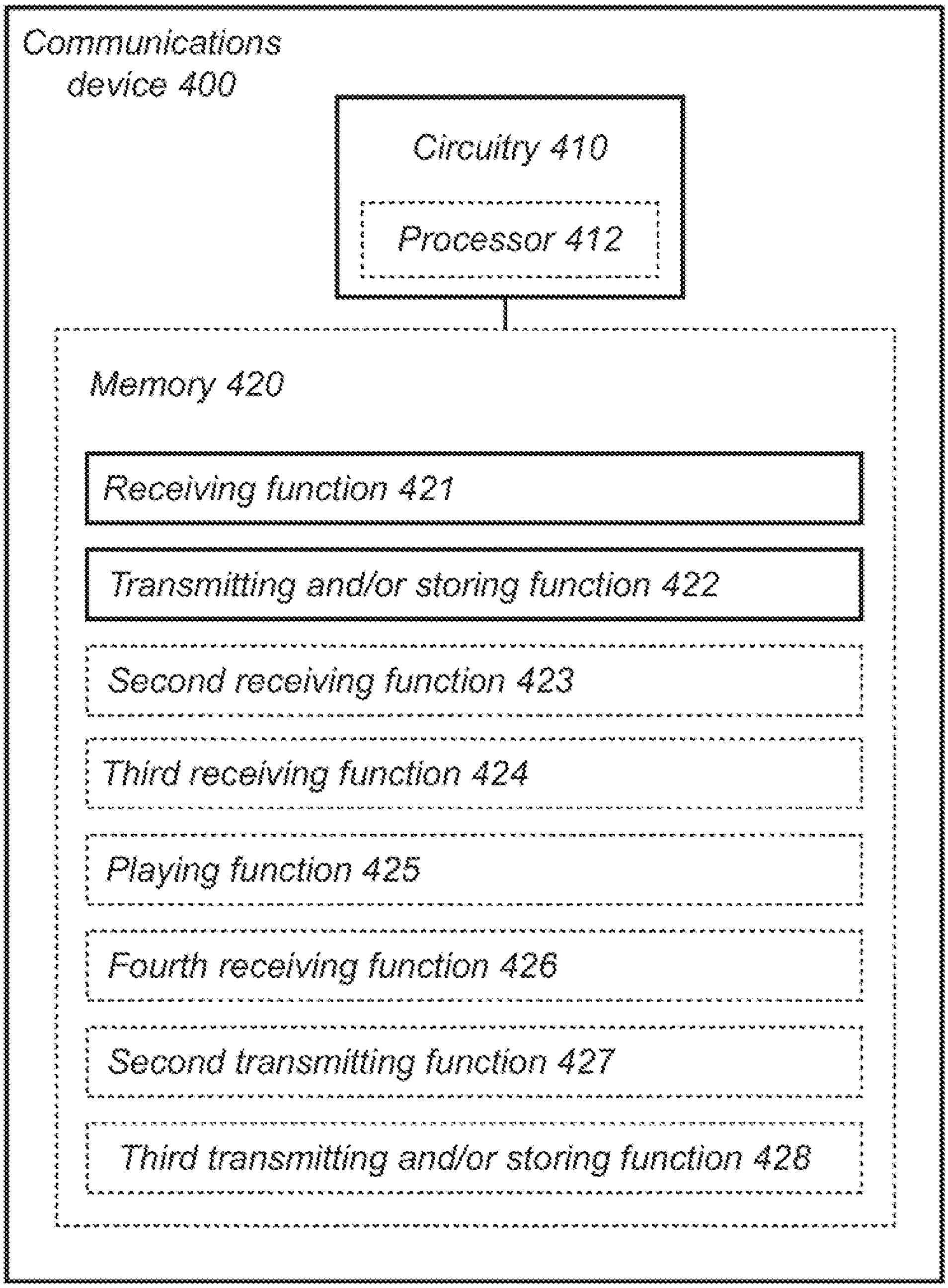
FIG. 4 shows a schematic diagram in relation to embodiments of a communications device configured for transmitting an availability notification and/or storing an availability status.

Embodiments of a communications device 400 configured for transmitting an availability notification will now be described with reference to FIG. 4. The method 200 described with reference to FIG. 2 may be implemented in the communications device 400. Hence, the description with reference to FIG. 2 with is relevant also in relation to the communications device 400. In the following "a/the communications device" corresponds to "a/the second communications device" in relation to FIG. 1 and "a/the further communications device" corresponds to "a/the first communications device" in relation to FIG. 1.

The communications device 400 comprises circuitry 410 configured to carry out functions of the communications device 400. The circuitry 410 may include one or more processors 412, such as a central processing unit (CPU), microcontroller, microprocessor etc. The one or more processors 412 are configured to execute program code such as program code configured to carry out the functions of the communications device 400.

The communications device 400 may further comprise one or more memories 420. The one or more memories 420 may be one or more of a buffer, a flash memory, a hard drive, a removable media, a volatile memory, a non-volatile memory, a random access memory (RAM), or another suitable device. In a typical arrangement, the one or more memories 420 may include a non-volatile memory for long term data storage and a volatile memory that functions as system memory for the circuitry 410. The memory 420 may exchange data with the circuitry 410 over a data bus. Accompanying control lines and an address bus between the one or more memories 420 and the circuitry 410 also may be present.

The functions of the communications device 400 may be embodied in the form of executable logic routines (e.g., lines of code, software programs, etc.) that are stored on one or more non-transitory computer readable mediums (e.g., the one or more memories 420) of the communications device 400 and are executed by the circuitry 410 (e.g., using the one or more processors 412). Furthermore, the functions of the communications device 400 may be a stand-alone software application or form a part of a software application that carries out additional tasks related to the communications device 400. The described functions may be considered a method that one or more processing units, e.g., the one or more processors 412 of the circuitry 410, are configured to carry out. Also, while the described functions may be implemented in software, such functionality may as well be carried out via dedicated hardware or firmware, or some combination of hardware, firmware and/or software.

The circuitry 410 of the communications device 400 is configured to execute a receiving function 421, and a transmitting and/or storing function 422.

The circuitry 410 of the communications device 400 is optionally configured to execute a second receiving function 423, a third receiving function 424, a playing function 425, a fourth receiving function 426, a second transmitting function 427, and a second transmitting and/or storing function 428.

The receiving function 421 is configured to receive a first notification indicating that the communications device is set to route a first audio stream relating to real time voice communication to at least one earphone that is wirelessly connected to the communications device.

The transmitting and/or storing function 422 is configured to, upon receipt of the first notification, transmit a second notification to a server indicating that the communications device is available for receiving and playing a first audio stream relating to real time voice communication and/or store a status at the communications device indicating that the communications device is available for receiving and playing a first audio stream relating to real time voice communication.

The circuitry 410 may be further configured to execute the second receiving function 423 configured to receive a third notification indicating that a further communications device is transmitting the first audio stream relating to real time voice communication to the communications device based on the second notification and the third receiving function 424 configured to receive the first audio stream from the further communications device. The circuitry 410 may then be further configured to execute the playing function 425 configured to play the first audio stream in the at least one earphone.

The circuitry 410 may be further configured to execute the fourth receiving function 426 configured to receive user input indicating that the user of the communications device wants to transmit and play a second audio stream relating to real time voice communication to the further communications device, and a second transmitting function 427 configured to transmit the second audio stream from the communications device to the further communications device.

The circuitry 410 may be further configured to execute the second transmitting and/or storing function 429 configured to transmit a sixth notification to a server indicating that the communications device is unavailable for receiving and playing the first audio stream relating to real time voice communication, and/or storing a status at the communications device indicating that the communications device is unavailable for receiving and playing the first audio stream relating to real time voice communications, upon receipt of one or more of

- a second user input indicating that the user is unavailable for receiving and playing the first audio stream relating to real time voice communication,
- a fourth notification indicating that no earphone is wirelessly connected to the communications device, and
- a fifth notification indicating that no earphone is arranged in an ear of the user of the communications device.

The above-mentioned optional features of the method according to the second aspect, when applicable, apply to the communications device of the fifth aspect as well. To avoid undue repetition, reference is made to the above.

Figure 5:
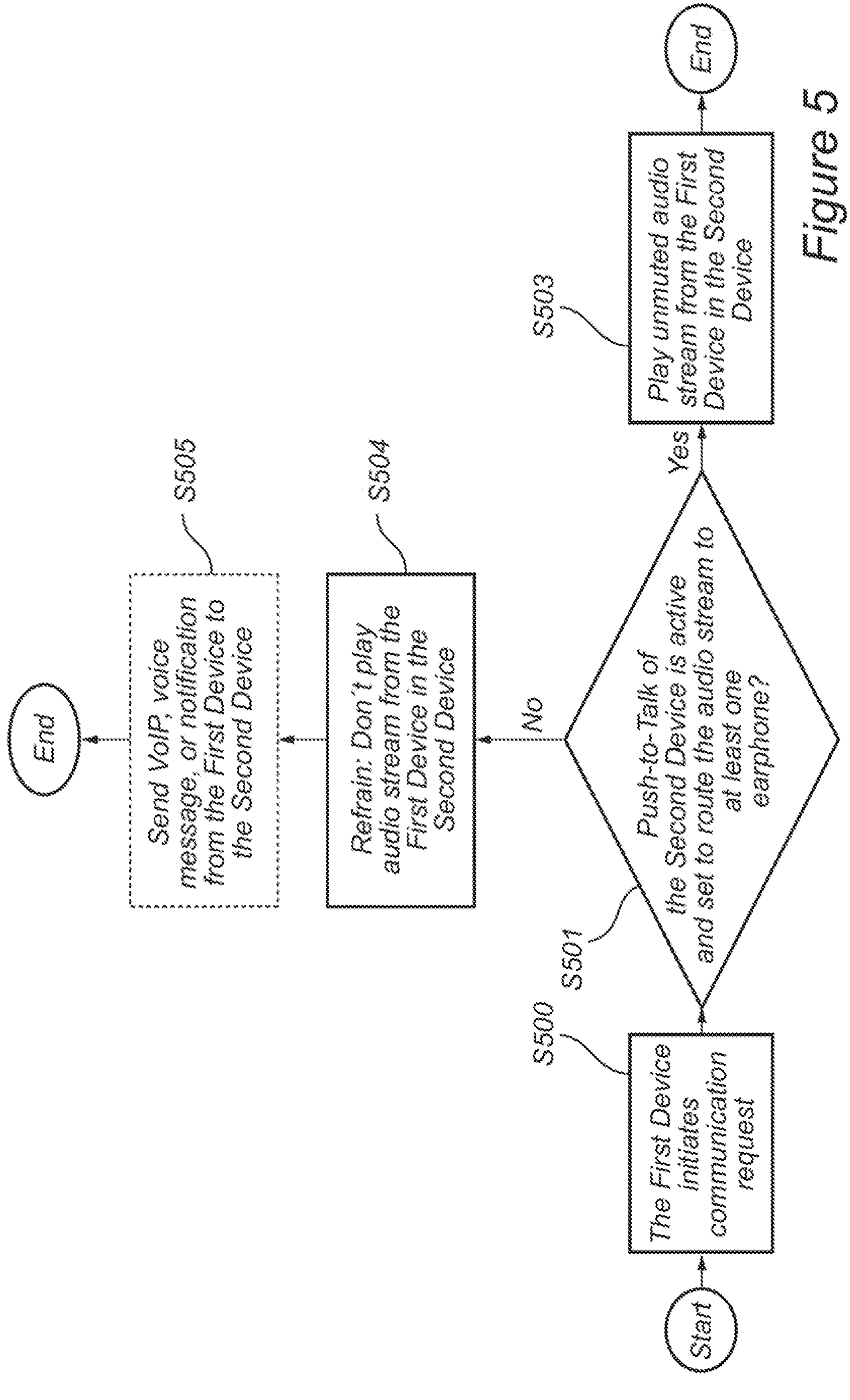
FIGS. 5, 6, and 7 show a flow charts in relation to a preferred embodiment of a method for managing a request to transmit and play an audio stream relating to real time voice communication.
Figure 6:
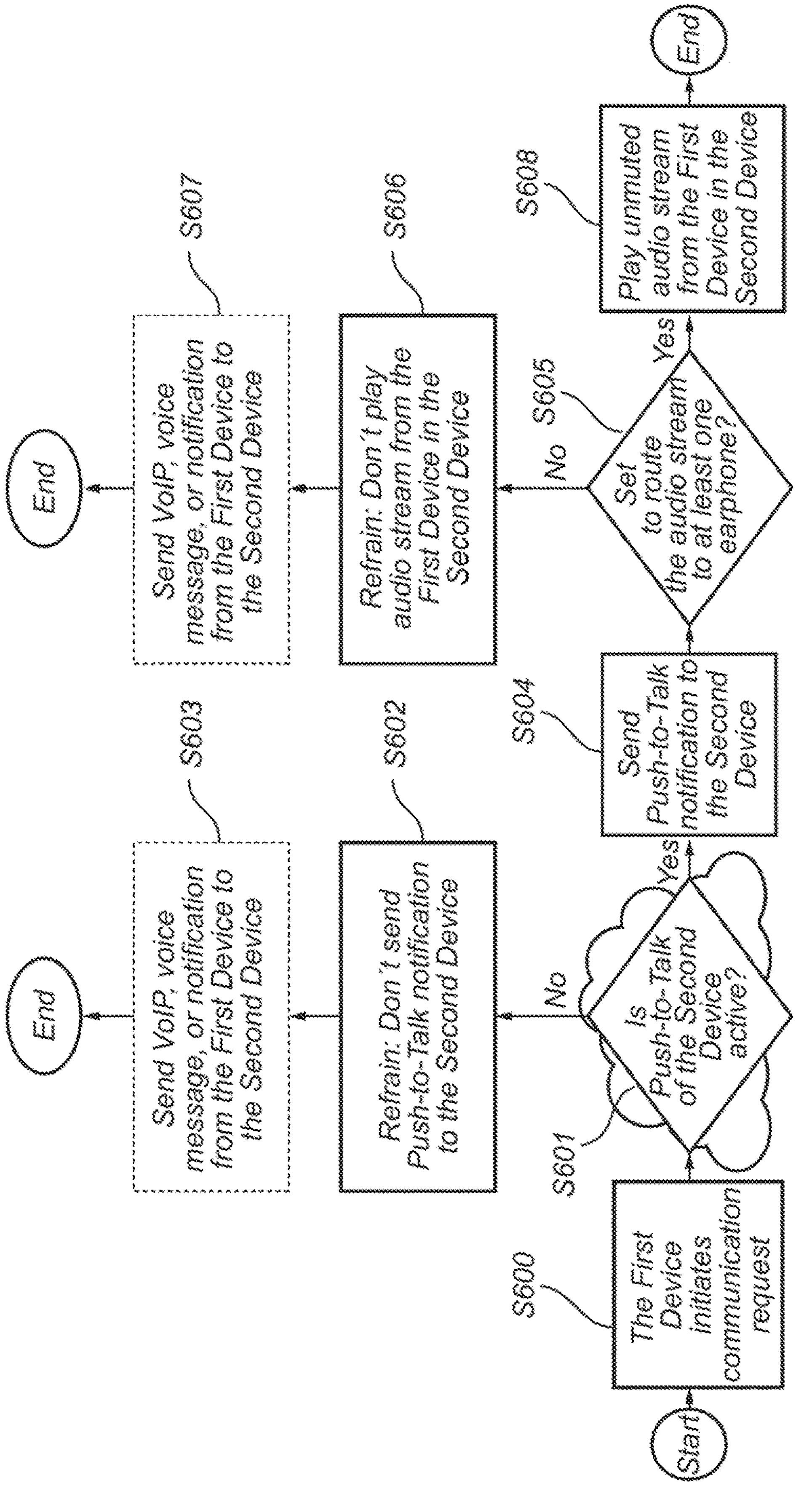
Figure 7:
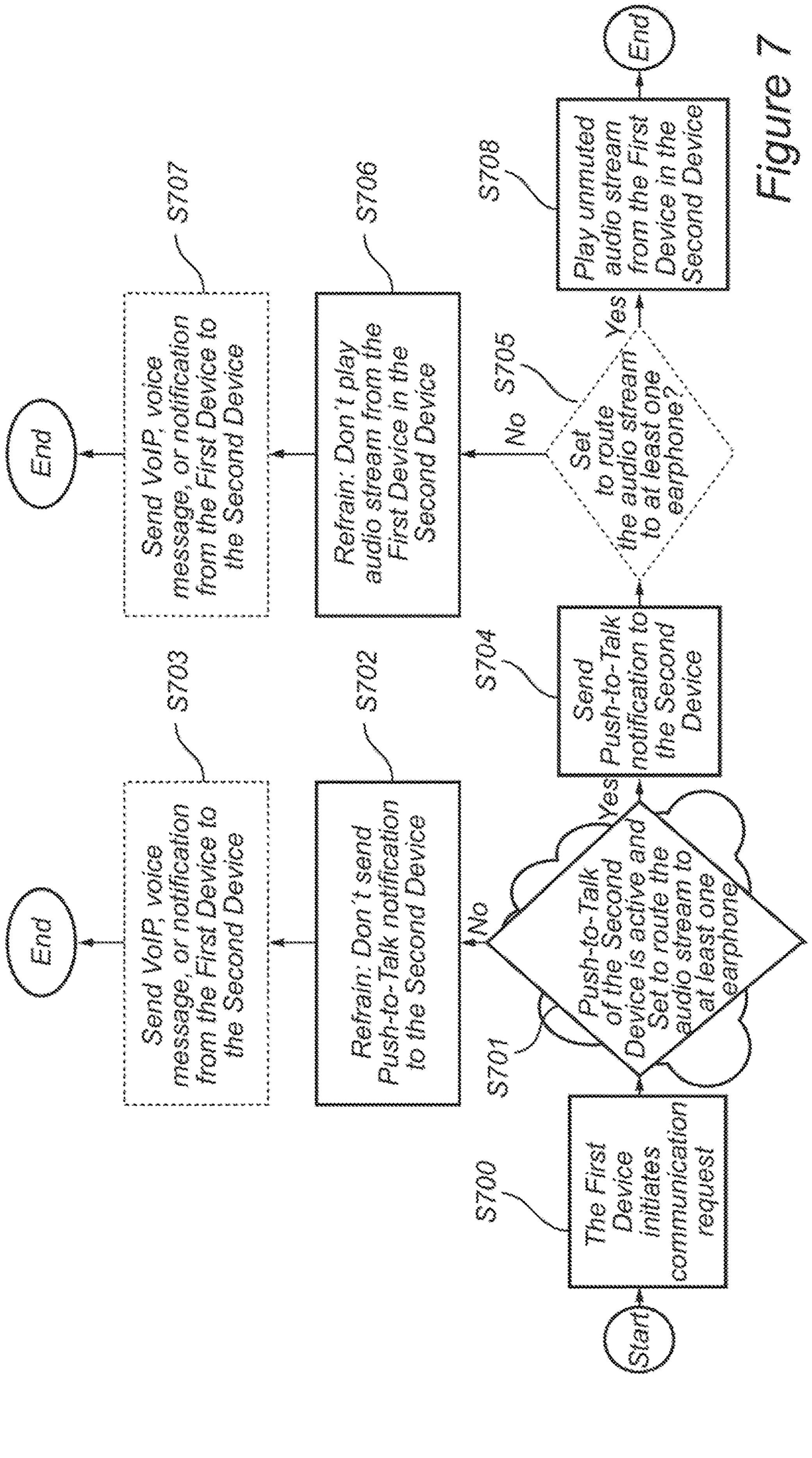

A preferred embodiment of a method for managing a request to transmit and play an audio stream relating to real time voice communication will now described with reference to FIGS. 5, 6, and 7, e.g. in relation to the first communications device 360 (further communications device) being a first iPhone and the second communications device 370 (communications device 400) being a first iPhone. In FIG. 5, a high-level overview is provided in relation to the first communications device 360 (further communications device) being a first iPhone. In FIGS. 6 and 7, detailed description of local check of availability and server-side check of availability, respectively is provided.

An app is installed in the first communications device 360 and also in the second communications device 370. The app enables voice communication between two or more users of communications devices such that users may for example establish connections between each other such that they may establish voice communication to each other. Each user, their contact information and their connections are then preferably stored in a central database related to the app, e.g. in the server 350. The app further enables storing of a current status of availability for receiving and playing an audio stream relating to real time voice communication for the communications devices of the respective users such that when the user of the first communications device attempts to transmit and play an audio stream relating to real time voice communications to a user of the second communications device, the audio stream will be played in at least one earphone wirelessly connected to the second communications device without the need for the user of the second communications device to perform any action if the second communications device is available and will not be played in at least one earphone wirelessly connected to the second communications device if the second communications device is unavailable. Specifically, the app in the second communications device 370 may receive a notification, e.g. from the second communications device 370, indicating that the second communications device is set to route the audio stream relating to real time voice communication to the at least one earphone that is wirelessly connected to the second communications device. This may for example be received upon wireless connection of the at least one earphone to the second communications device 370 or upon arranging the at least one earphone in an ear of the user of the second communications device 370. The app then stores a status locally in the second communications device 370 indicating that the second communications device 370 is available for receiving and playing the audio stream relating to real time voice communication and/or it transmits a notification to the server 350 in which a status may then be stored indicating that the second communications device is available for receiving and playing the audio stream in relation to real time voice communication. Similarly, the app in the second communications device 370 may receive a notification, e.g. from the second communications device, indicating that the second communications device is not set to route the audio stream relating to real time voice communication to the at least one earphone that is wirelessly connected to the second communications device. This may for example be received when it is detected, e.g. by the second communications device 370, that no earphone is wirelessly connected to the second communications device 370 or when it is detected, e.g. by the second communications device 370, that a last earphone is removed from an ear of the user of the second communications device 370. The app may then stores a status locally in the second communications device 370 indicating that the second communications device 370 is unavailable for receiving and playing the audio stream in relation to real time voice communication and/or it transmits a notification to the server 350 in which a status may then be stored indicating that the second communications device is unavailable for receiving and playing the audio stream in relation to real time voice communication. Automatically storing a status indicating availability or transmitting a notification to a server for storing a status indicating availability may be configure for an iPhone by means of Shortcuts (https://developer.apple.com/documentation/appintents/app-shortcuts) and Automation (https://support.apple.com/en-gb/guide/shortcuts/apdfbdbd7123/7.0/ios/17.0).

Reference is now made to FIG. 5 providing a high-level overview of a preferred embodiment of a method of managing a request to transmit and play an audio stream relating to real time voice communication. The method is initiated with the first communications device initiating S500 a request to communicate with the second communications device, e.g. to transmit and play an audio stream relating to real time voice communication from a first communications device to a second communications device. This is followed by checking S501 whether two conditions hold true: 1) that Push-To-Talk is activated (i.e. the second communication device is in/has an active Push-to-Talk channel) on the second communications device and 2) that the second communications device is set to route the audio stream to at least one earphone that is wirelessly connected to the second communications device. It is to be noted that the order in which the two conditions are checked is not important. Moreover, the second condition may be checked on the server side or locally on the second communications device or both server-side and locally, see FIGS. 6 and 7. If it is checked server side it is based on a value updated from the second communications device. If it is checked locally, it can either be based on a locally stored value on the second communications device or by checking in real time whether the second communications device is set to route the audio stream to at least one earphone.

If the conditions checked S501 are true, the method continues with playing S503 an unmuted, non-empty, and non-constant audio stream from the first communication device in the at least one earphone that is wirelessly connected to the second communications device. If any of the conditions checked S501 is false, the method continues with refraining S504 from playing the audio stream from the first communications device in the second communications device. Note, however, that the user of the second communications device can, via user input, for example, via a push notification or a Live Activity (https://developer.apple.com/design/human-interface-guidelines/live-activities), bypass this behavior and play the unmuted, non-empty, and non-constant audio stream from the first communication device in the second communications device. Optionally, the user of the first communication device may during S505 choose to send a VoIP call request, voice message, or a pinging notification to the second communications device.

Reference is now made to FIG. 6 providing a detailed description in relation to local check of availability in an embodiment of a method of managing a request to transmit and play an audio stream relating to real time voice communication. The method starts when the first communications device initiates S600 a request to communicate with the second communications device, e.g. to transmit and play an audio stream relating to real time voice communication from a first communications device to a second communications device. This is followed by checking S601 if Push-To-Talk is activated (i.e. the second communication device is in/has an active Push-to-Talk channel) on the second communications device. This may be done by checking for a stored value on the server or by asking the client directly. If the condition in S601 is true, the server will send S604 a Push-to-Talk notification (e.g. using Apple Push Notification service (APNs) with apns-push-type: pushtotalk) to the second communications device. Once the Push-to-Talk notification is received, it is checked S605 locally on the second communication device if it is set to route the audio stream to at least one earphone that is wirelessly connected to the second communications device. If the condition checked S605 in relation to routing of the audio stream is true, the method will continue with playing to S608 an unmuted, non-empty, and non-constant audio stream from the first communication device in the at least one earphone that is wirelessly connected to the second communications device. If the condition checked S605 in relation to routing of the audio stream is false, the method will continue with refraining S606 from playing the audio stream from the first communications device in the second communications device. Note, however, that the user of the second communications device can, via user input, for example, via a push notification or a Live Activity (https://developer.apple.com/design/human-interface-guidelines/live-activities), bypass this behavior and play the unmuted, non-empty, and non-constant audio stream from the first communication device in the second communications device. Optionally, the user of the first communication device may choose to send S607 a VoIP call request, voice message, or a pinging notification to the second communications device.

If the condition checked S601 in relation to Push-To-Talk is false, the method continues with refraining from S602 sending a Push-to-Talk notification (e.g. using Apple Push Notification service (APNs) with apns-push-type: pushtotalk) to the second communications device. Optionally, the user of the first communication device may choose to send S603 a VoIP call request, voice message, or a pinging notification to the second communications device. Reference is now made to FIG. 7 providing a detailed description in relation to server-side check of availability in an embodiment of a method of managing a request to transmit and play an audio stream relating to real time voice communication. The method when the first communications device initiates S700 a request to communicate with the second communications device, e.g. to transmit and play an audio stream relating to real time voice communication from a first communications device to a second communications device. This is followed checking S701 that two conditions hold true: 1) that Push-To-Talk is activated (i.e. the second communication device is in/has an active Push-to-Talk channel) on the second communications device and 2) that the second communications device is set to route the audio stream to at least one earphone that is wirelessly connected to the second communications device. It is to be note that the order in which the two conditions are checked is not important. This may be done by checking for a stored value on the server or by asking the client directly. If the conditions checked S701 are true, the server will proceed to send S704 a Push-to-Talk notification (e.g. using Apple Push Notification service (APNs) with apns-push-type: pushtotalk) to the second communications device. Once the Push-to-Talk notification is received, the method continues with checking S705 locally on the second communication device if it is set to route the audio stream to the at least one earphone that is wirelessly connected to the second communications device. If the condition checked S705 in relation to routing of the audio stream is true, the method will continue with playing S708 an unmuted, non-empty, and non-constant audio stream from the first communication device in the at least one earphone that is wirelessly connected to the second communications device. If the condition checked S705 in relation to routing of the audio stream is false, the method will continue with refraining S706 from playing the audio stream from the first communications device in the second communications device. Note, however, that the user of the second communications device can, via user input, for example, via a push notification or a Live Activity (https://developer.apple.com/design/human-interface-guidelines/live-activities), bypass this behavior and play the unmuted, non-empty, and non-constant audio stream from the first communication device in the second communications device. Optionally, the user of the first communication device may choose to send S707 a VoIP call request, voice message, or a pinging notification to the second communications device.

If the condition checked S701 in relation to Push-To-Talk is false, the method continues with refraining from S702 sending a Push-to-Talk (e.g. using Apple Push Notification service (APNs) with apns-push-type: pushtotalk) to the second communications device. Optionally, the user of the first communication device may choose to send S703 a VoIP call request, voice message, or a pinging notification to the second communications device.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

ITEMIZED LIST

Item 1. A method for managing a request to transmit and play an audio stream relating to real time voice communication, the method comprising:
- receiving the request to transmit and play an audio stream relating to real time voice communication from a first communications device to a second communications device;
- determining whether the second communications device is available for receiving and playing the audio stream relating to real time voice communication, wherein the second communications device is determined to be available on condition that the second communications device is set to route the audio stream relating to real time voice communication to at least one earphone that is wirelessly connected to the second communications device; and
- on condition that the second communications device is determined to be available playing the audio stream relating to real time voice communication in the at least one earphone.

Item 2. The method according to item 1, further comprising:
- determining that the second communications device is set to route the audio stream relating to real time voice communication to the at least one earphone by determining that the at least one earphone is arranged in an ear of a user of the second communications device.

Item 3. The method according to item 2, further comprising:
- detecting, by a sensor comprised in the at least one earphone, that the at least one earphone is arranged in the ear of the user; and
- notifying, by the at least one earphone, the second communications device that the at least one earphone is arranged in the ear of the user.

Item 4. The method according to any one of the preceding items, further comprising one or more of:
- receiving a first notification from the second communications device indicating that the at least one earphone is wirelessly connected to the second communications device,
- receiving a second notification from the second communications device indicating that no earphone is wirelessly connected to the second communications device,
- receiving a third notification from the second communications device indicating that the at least one earphone is arranged in the ear of the user,
- receiving a fourth notification from the second communications device indicating that no earphone is arranged in any ear of the user,
- receiving a fifth notification from the second communications device indicating that the second communications device is available,
- receiving a sixth notification from the second device indicating that the second communications device is unavailable,
- storing a first status at a server indicating whether the second communications device is available, and
- storing a second status at the second device indicating whether the second communications device is available.

Item 5. The method according to any one of the preceding items, further comprising:
- on condition that it is determined that the second communications device is not set to route the audio stream relating to real time voice communication to any ear phone that is wirelessly connected to the second communications device, refraining from transmitting the audio stream relating to real time voice communication from the first communications device to the second communications device or refraining from playing the audio stream relating to real time voice communication in the second communications device.

Item 6. The method according to any one of the preceding items, further comprising:
- transmitting a seventh notification to the second communications device indicating that the first communications device requests to transmit and play the audio stream relating to real time voice communication at the second communications device.

Item 7. The method according to claim 6, further comprising:
- receiving, from the second communications device, an eighth notification indicating whether the second communications device is available.

Item 8. The method according to any one of the preceding items, wherein the at least one earphone is wirelessly connected to the second communications device via Bluetooth.

Item 9. The method according to any one of the preceding items, further comprising:
- establishing a voice communication session between the first communications device and the second communications device.

Item 10. The method according to item 9, wherein establishing a voice communication session comprises:

creating a communications channel;

adding the first communications device and the second communications device to the communications channel; and transmitting the audio stream relating to real time voice communication from the first communications device to the second communications device based on the communications channel.

Item 11. A non-transitory computer-readable storage medium having stored thereon instructions executable by at least one processor to:

receive a request to transmit and play an audio stream relating to real time voice communication from a first communications device to a second communications device;

determine whether the second communications device is available for receiving and playing the audio stream relating to real time voice communication, wherein the second communications device is determined to be available on condition that the second communications device is set to route the audio stream relating to real time voice communication to at least one earphone wirelessly connected to the second communications device; and on condition that the second communications device is determined to be available, play the audio stream relating to real time voice communication in the at least one earphone.

Item 12. A method performed by a second communications device, the method comprising:

receiving a first notification indicating that the second communications device is set to route a first audio stream relating to real time voice communication to at least one earphone that is wirelessly connected to the second communications device;

upon receipt of the first notification, performing at least one of: transmitting a second notification to a server indicating that the second communications device is available for receiving and playing a first audio stream relating to real time voice communication; and storing a status at the second communications device indicating that the second communications device is available for receiving and playing the first audio stream relating to real time voice communication.

Item 13. The method according to item 12, further comprising receiving a third notification indicating that a first communications device is transmitting the first audio stream relating to real time voice communication to the second communications device based on the second notification; and receiving the first audio stream from the first communications device.

Item 14. The method according to item 13, further comprising:

playing the first audio stream in the at least one earphone that is wirelessly connected to the second communications device.

Item 15. The method according to any one of items 12-14, further comprising:

receiving a first user input indicating that the user of the second communications device wants to transmit and play a second audio stream relating to real time voice communication to the first communications device; and transmitting the second audio stream from the second communications device to the first communications device.

Item 16. The method according to any one of items 12-15, further comprising:

upon receipt of one or more of:

a second user input indicating that the user is unavailable for receiving and playing the first audio stream relating to real time voice communication, a fourth notification indicating that no earphone is wirelessly connected to the second communications device, and a fifth notification indicating that no earphone is arranged in an ear of the user of the second communications device, performing at least one of:

transmitting a sixth notification to the server indicating that the second communications device is unavailable for receiving and playing the first audio stream relating to real time voice communication, or storing a status at the second communications device indicating that the second communications device is unavailable for receiving and playing the first audio stream relating to real time voice communication.

Item 17. A non-transitory computer-readable storage medium having stored thereon instructions for implementing the method according to any one of items 12 to 16 when executed in a device having processing capability.

The invention claimed is:

1. A method for managing a request to transmit and play an audio stream relating to real time voice communication, the method comprising:

receiving the request to transmit and play an audio stream relating to real time voice communication from a first communications device to a second communications device;

determining whether the second communications device is available for receiving and playing the audio stream relating to real time voice communication, wherein the second communications device is determined to be available on condition that the second communications device is set to route the audio stream relating to real time voice communication to at least one earphone that is wirelessly connected to the second communications device; and on condition that the second communications device is determined to be available playing the audio stream relating to real time voice communication in the at least one earphone.

2. The method according to claim 1, further comprising:

determining that the second communications device is set to route the audio stream relating to real time voice communication to the at least one earphone by determining that the at least one earphone is arranged in an ear of a user of the second communications device.

3. The method according to claim 2, further comprising:

detecting, by a sensor comprised in the at least one earphone, that the at least one earphone is arranged in the ear of the user; and notifying, by the at least one earphone, the second communications device that the at least one earphone is arranged in the ear of the user.

4. The method according to claim 1, further comprising one or more of:

receiving a first notification from the second communications device indicating that the at least one earphone is wirelessly connected to the second communications device, receiving a second notification from the second communications device indicating that no earphone is wirelessly connected to the second communications device, receiving a third notification from the second communications device indicating that the at least one earphone is arranged in the ear of the user, receiving a fourth notification from the second communications device indicating that no earphone is arranged in any ear of the user, receiving a fifth notification from the second communications device indicating that the second communications device is available, receiving a sixth notification from the second device indicating that the second communications device is unavailable, storing a first status at a server indicating whether the second communications device is available, and storing a second status at the second device indicating whether the second communications device is available.

5. The method according to claim 1, further comprising:

on condition that it is determined that the second communications device is not set to route the audio stream relating to real time voice communication to any ear phone that is wirelessly connected to the second communications device, refraining from transmitting the audio stream relating to real time voice communication from the first communications device to the second communications device or refraining from playing the audio stream relating to real time voice communication in the second communications device.

6. The method according to claim 1, further comprising:

transmitting a seventh notification to the second communications device indicating that the first communications device requests to transmit and play the audio stream relating to real time voice communication at the second communications device.

7. The method according to claim 6, further comprising:

receiving, from the second communications device, an eighth notification indicating whether the second communications device is available.

8. The method according to claim 1, wherein the at least one earphone is wirelessly connected to the second communications device via Bluetooth.

9. The method according to claim 1, further comprising:

establishing a voice communication session between the first communications device and the second communications device.

10. The method according to claim 9, wherein establishing a voice communication session comprises:

creating a communications channel;

adding the first communications device and the second communications device to the communications channel; and transmitting the audio stream relating to real time voice communication from the first communications device to the second communications device based on the communications channel.

11. A non-transitory computer-readable storage medium having stored thereon instructions executable by at least one processor to:

receive a request to transmit and play an audio stream relating to real time voice communication from a first communications device to a second communications device;

determine whether the second communications device is available for receiving and playing the audio stream relating to real time voice communication, wherein the second communications device is determined to be available on condition that the second communications device is set to route the audio stream relating to real time voice communication to at least one earphone wirelessly connected to the second communications device; and on condition that the second communications device is determined to be available, play the audio stream relating to real time voice communication in the at least one earphone.

* * * * *